United States Patent
MacCormick

(10) Patent No.: US 7,685,179 B2
(45) Date of Patent: Mar. 23, 2010

(54) NETWORK FLOW FOR CONSTRAINED REPLICA PLACEMENT

(75) Inventor: John P. MacCormick, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 361 days.

(21) Appl. No.: 11/717,285

(22) Filed: Mar. 13, 2007

(65) Prior Publication Data

US 2008/0228836 A1 Sep. 18, 2008

(51) Int. Cl.
*G06F 12/00* (2006.01)
*G06F 17/30* (2006.01)

(52) U.S. Cl. .................. 707/204; 707/202; 706/19; 709/226; 714/1

(58) Field of Classification Search .......... 707/200–204
See application file for complete search history.

(56) References Cited

U.S. PATENT DOCUMENTS

| | | | |
|---|---|---|---|
| 5,423,037 A * | 6/1995 | Hvasshovd | 707/202 |
| 6,070,191 A * | 5/2000 | Narendran et al. | 709/226 |
| 6,317,778 B1 | 11/2001 | Dias et al. | 709/214 |
| 6,484,204 B1 | 11/2002 | Rabinovich | 709/226 |
| 6,499,037 B1 * | 12/2002 | Breitbart et al. | 707/103 R |
| 6,516,350 B1 * | 2/2003 | Lumelsky et al. | 709/226 |
| 6,587,844 B1 * | 7/2003 | Mohri | 706/20 |
| 6,938,084 B2 | 8/2005 | Gamache et al. | 709/226 |
| 7,020,665 B2 | 3/2006 | Douceur et al. | 707/200 |
| 7,065,618 B1 * | 6/2006 | Ghemawat et al. | 711/161 |
| 2004/0088147 A1 | 5/2004 | Wang et al. | |
| 2004/0267752 A1 | 12/2004 | Wong et al. | 707/9 |
| 2006/0112242 A1 | 5/2006 | McBride et al. | 711/161 |
| 2006/0168154 A1 | 7/2006 | Zhang et al. | 709/220 |
| 2006/0206621 A1 | 9/2006 | Toebes et al. | 709/238 |
| 2006/0271547 A1 | 11/2006 | Chen et al. | 707/10 |
| 2008/0052327 A1 * | 2/2008 | Buah | 707/204 |

OTHER PUBLICATIONS

"Some Approaches to Solve a Web Replica Location Problem in MPLS Networks," by Walkowiak, Krzysztof, in Proceedings of the IFIP TC6/WG6.4 Workshop on Internet Technologies, Applications and Social Impact, 2002, 12 pages. Available at http://www.kssk.pwr.wroc.pl/walkowiak/papers/2002/kw-replica-location-mpls-witasi02.pdf (last accessed on Apr. 15, 2009).*

"Minimal Cost Replication of Dynamic Web Contents under Flat Update Delivery," by Tang et al., IEEE Transactions on Parallel and Distributed Systems, vol. 15, No. 5, May 2004, pp. 431-439.*

"Replica Placement in Adaptive Content Distribution Networks," by Buchholz and Buchholz. In: 2004 ACM Symposium on Applied Computing (2004) pp. 1705-1710. Available at: ACM.*

"Placement Problems for Transparent Data Replication Proxy Services," by Xu and Lee. In: IEEE Journal on Selected Areas in Communications, vol. 20, No. 7 (Sep. 2002). Available at: IEEE.*

"Dynamice Replica Placement in Content Delivery Networks," by Presti et al. In: Proceedings of the 13th IEEE Int'l Symposium on Modeling, Analysis and Simulation of Computer Telecommunication Systems (2005). Available at: IEEE.*

(Continued)

*Primary Examiner*—Neveen Abel Jalil
*Assistant Examiner*—Daniel Kinsaul
(74) *Attorney, Agent, or Firm*—Woodcock Washburn LLP

(57) ABSTRACT

A deterministic technique is used for assigning locations to object replicas in a data center, while taking the various constraints into account that guarantee high availability and fast recovery. Example constraints include not putting the replicas on the same machine and not on the same rack, in case the rack or the network switch goes down. Also, because power distribution units (PDUs) can fail, the two replicas are not put on the same PDU. A solution is guaranteed to be found, if one exists.

16 Claims, 5 Drawing Sheets

OTHER PUBLICATIONS

"Comptetitive On-Line Algorithms for Distributed Data Management," by Lund et al. In: Society for industrial and Applied Matehmatics, vol. 28, No. 3, pp. 1086-1111 (1999). Available at: http://citeseerx.ist.psu.edu/viewdoc/download?doi=10.1.1.44.9219& rep=rep1&type=pdf Last Visited: Oct. 30, 2009.*

Buchholz, S. et al., "Replica Placement in Adaptive Content Distribution Networks", SAC, 2004, http://www.rn.inf.tu-dresden.de/scripts_lsrn/veroeffent_print/SAC2004.pdf, 6 pages.

Chen, Y. et al., "Dynamic Replica Placement for Scalable Content Delivery", http://www.cs.rice.edu/Conferences/IPTPS02/184.pdf, 6 pages.

McCue, D.L. et al., "Computing Replica Placement in Distributed Systems", IEEE, 1992, http://ieeexplore.ieee.org/xpl/freeabs_all.jsp?arnumber+242617, 58-61.

* cited by examiner

NETWORK FLOW FOR CONSTRAINED REPLICA PLACEMENT

BACKGROUND

A data center generally has a cluster of computers, and each computer has some storage, such as hard disks, attached to it. Objects such as a file, a collection of files, or other types of data may be stored on the computer's storage. Replicas or copies of the objects are also desirably stored on one or more machines in the cluster. It is desirable to have multiple replicas of the object so in case one replica storage gets corrupted or destroyed or if an associated machine becomes unavailable, another replica can still be accessed. For example, two replicas may be stored, referred to as a primary replica and a secondary replica. The two replicas of a given object are said to be peers of each other.

A problem is determining where to store the primary and secondary replica of each object among the computers in the cluster in such a way that certain constraints are not violated. For example, it might be desirable that every object has at least one of its replicas available whenever some class of common failures occurs.

It is desirable to assign storage locations to object replicas such that high availability and fast recovery may be achieved. Conventional methods of solving the replica-assignment problem rely on trial and error.

SUMMARY

A deterministic technique is used for assigning locations to object replicas in a data center, while taking the various constraints into account that guarantee high availability and fast recovery. Example constraints include not putting the replicas on the same machine and not on the same rack, in case the rack or the network switch goes down. Also, because power distribution units (PDUs) can fail, the two replicas are desirably not put on the same PDU. A solution is guaranteed to be found, if one exists.

More particularly, the replica-assignment problem is transformed into a network flow problem and then solved. Various techniques have been developed to solve the network flow problem. After the replica-assignment problem is transformed into a network flow problem, these techniques can be used to solve the network flow problem. The solution will provide an assignment of replicas to computers that satisfies the constraints, provided such a solution exists.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the invention, there is shown in the drawings example constructions of the invention; however, the invention is not limited to the specific methods and instrumentalities disclosed. In the drawings.

DETAILED DESCRIPTION OF ILLUSTRATIVE EMBODIMENTS

Figure 1:
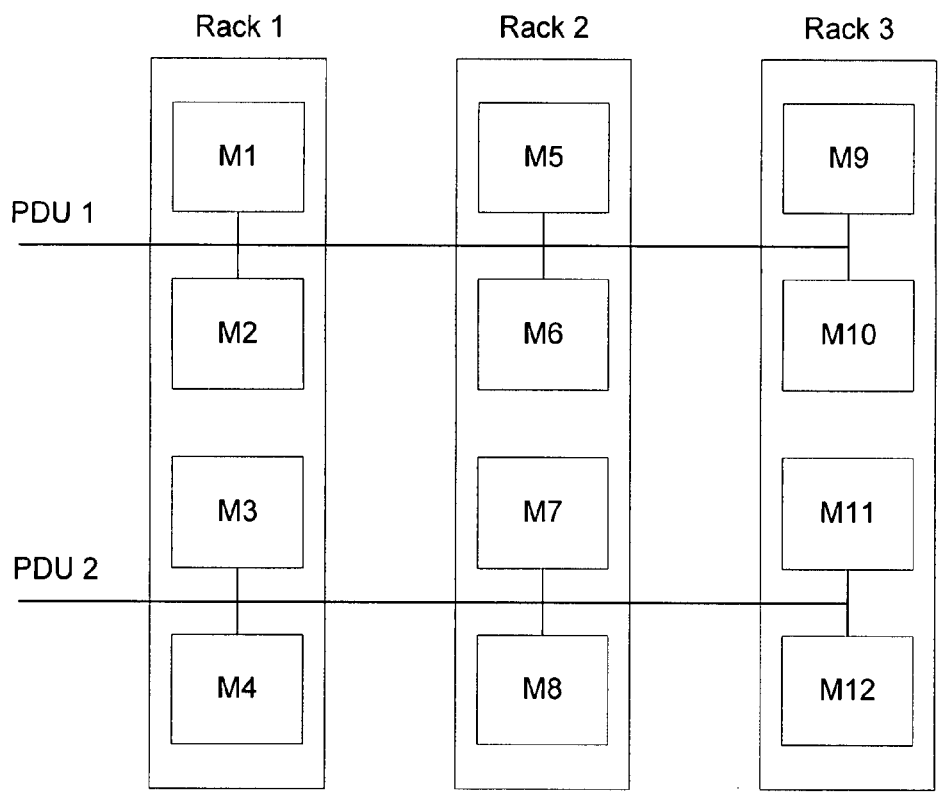
FIG. 1 is a diagram of an example cluster of computers onto which objects and their replicas may be placed.

FIG. 1 is a diagram of an example cluster of computers onto which objects and their replicas may be placed. Computers (e.g., machines M1-M12) are placed in racks (e.g., racks 1, 2, 3). Each machine has storage space for a given number of primary object replicas and secondary object replicas. The machines are connected to power distribution units (PDUs). Now it is to be determined onto which machines should the replicas be placed. As described further herein, example constraints include: replicas cannot be on the same rack, replicas cannot be on the same PDU, and no pair of machines may act as the primary and secondary for more than one object. It is noted that any number of machines, racks, and PDUs may be used, and is not limited to those numbers described or shown herein.

It is desirable to have multiple (e.g., two) copies or replicas of an object or a file so in case one storage gets corrupted, or if a machine goes down, a backup may be obtained from the replica. The replicas are referred to as primary and secondary.

The replica-assignment problem is transformed into a network flow problem and then solved. The network flow problem is a well-studied mathematical problem, and various conventional techniques have been developed to solve the network flow problem. After the replica-assignment problem is transformed into a network flow problem, these conventional techniques can be used to solve the network flow problem, which will result in an assignment of replicas to computers or machines that satisfies all the constraints (provided such a solution exists).

Physical constraints on where to put the replicas are desirably used, along with the constraint of not using the same pair of machines to act as the primary and secondary for more than one object, described further herein.

Certain types of constraints are of great practical value. For instance, it might be desirable that every object has at least one of its replicas available whenever some class of common failures occurs. A first example of this type of constraint arises because the computers in the cluster are mounted in racks, and each rack is connected to the cluster via a single network switch. If this switch fails, all data stored on the computers in the rack becomes unavailable. Therefore, the constraint "no object may have its primary and secondary replicas stored on the same rack" follows. A second example of this type of constraint arises because the computers are connected to PDUs. If a particular PDU fails, all of the computers connected to that PDU lose power and their data is unavailable. Therefore, this results in the constraint that "no object may have its primary and secondary replicas stored on computers that are attached to the same PDU".

A different type of constraint arises because it is desirable to achieve rapid, parallel recovery from failures. If a computer suffers a permanent failure and all data stored on that computer is lost, then all the object replicas that were lost must be replaced by rebuilding them somewhere else. Consider the set of object replicas that are peers of the lost object replicas. These are referred to as the sources for the recovery, since it is these replicas that will supply the data that must be rebuilt.

Suppose the time to rebuild one object is T. If every source is stored on a different computer, then the rebuilds can be done in parallel and the total time to recover is T. But if, on the other hand, there are multiple source replicas on some computer, say m of them, then these replicas cannot be rebuilt in parallel, and the time to recover is at least mT. This number m may be referred to as the "recovery multiple" for the system. The optimal recovery multiple is m=1, by definition, but systems close to the optimum are also of interest. As described herein, a recovery multiple of m=2 is guaranteed. Hence, because it is desirable to achieve a short recovery time, the constraint "at most two elements of the set of peers of replicas on any one computer must be stored on any other single computer" is formed.

In other words, no pair of machines may act as primary and secondary for more than two distinct object replicas (i.e., for more than two objects).

Also, there are likely to be constraints arising from load-balancing. For instance, it is often desirable to have the same number of primary and secondary replicas on every computer. This too can be expressed as a constraint.

Figure 2:
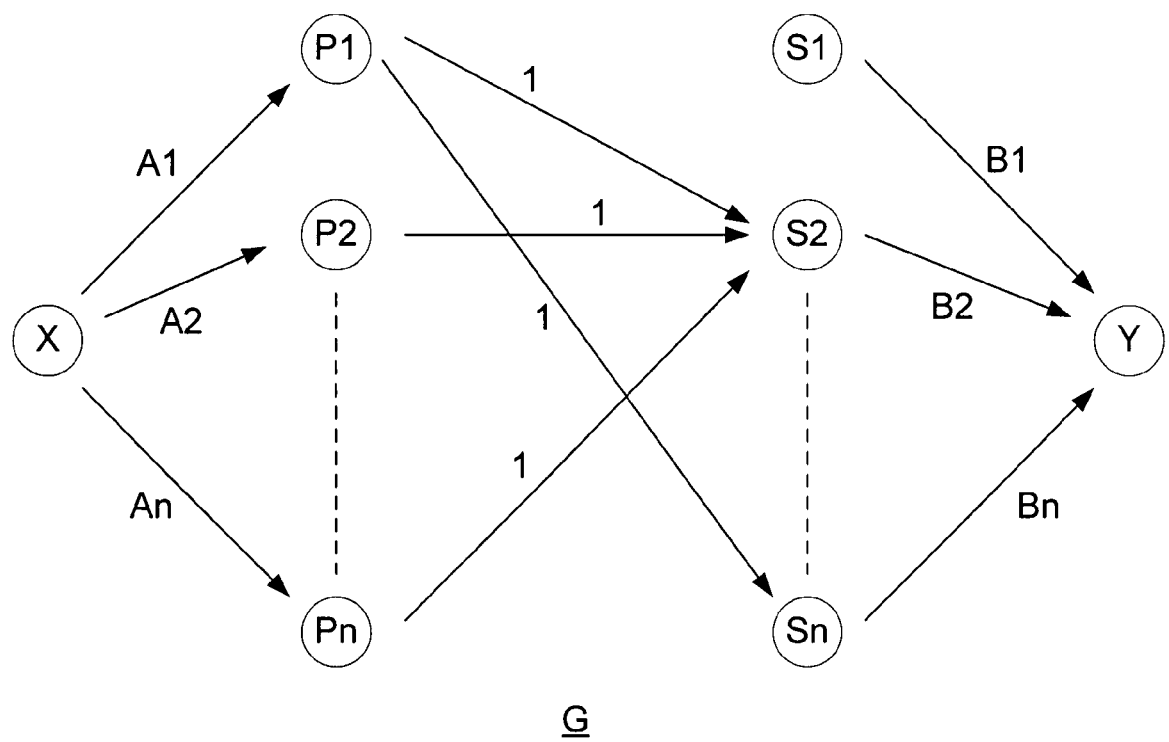
FIG. 2 is a diagram of an example weighted, directed graph.
Figure 3:
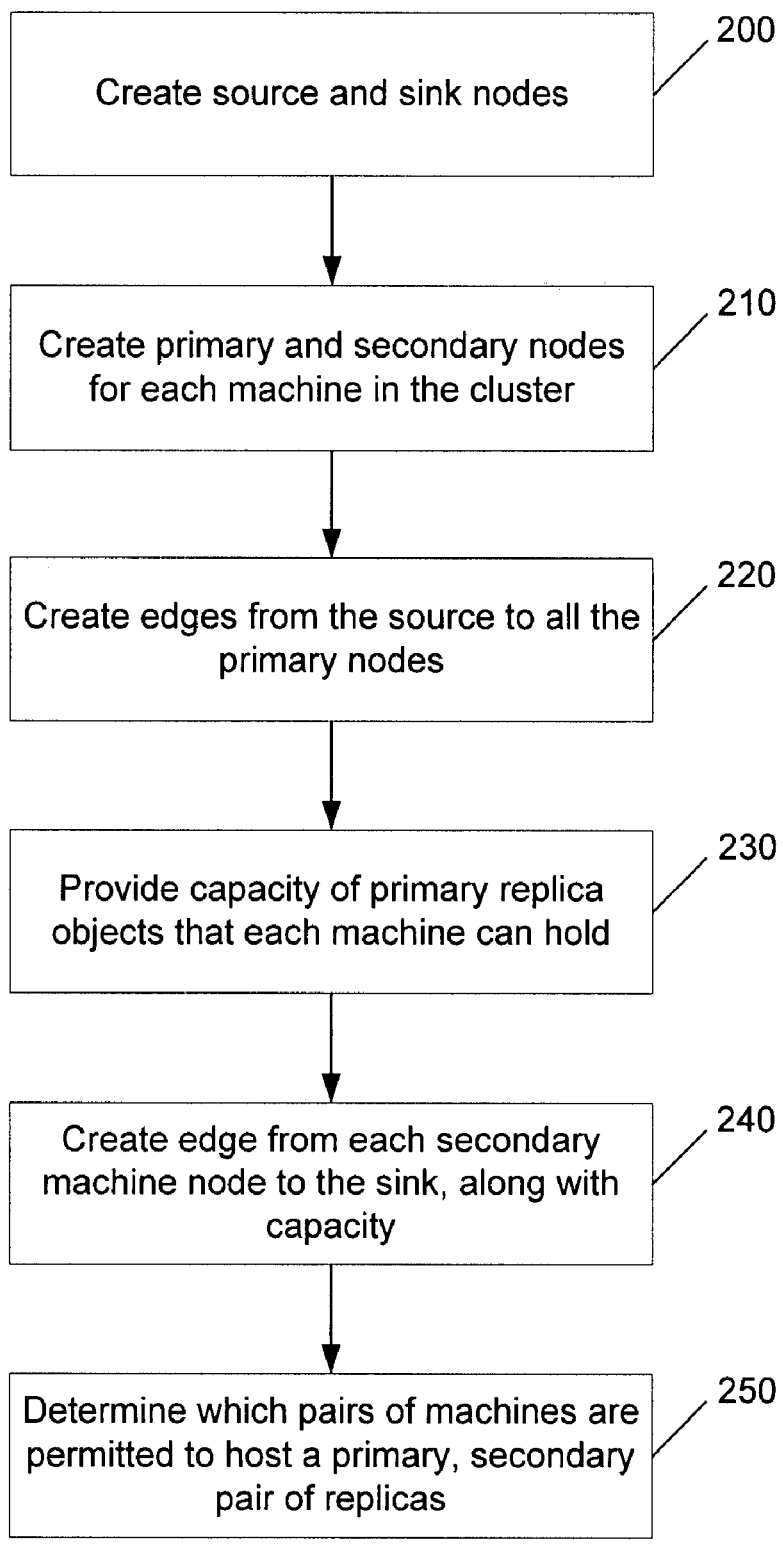
FIG. 3 is a flow diagram of an example method of constructing a directed graph.

According to an embodiment, a weighted, directed graph G is constructed using points (nodes) which are linked by directed edges. G is a set of nodes connected by directed edges, each of which has an associated weight, which is a positive number. The final graph G, an example of which is shown in FIG. 2, represents a network flow problem which can be solved using well-known algorithms. FIG. 3 is a flow diagram of an example method of constructing such a graph.

A source node X and a sink node Y are created, at step 200. For each machine in the cluster, two nodes are created (a primary machine node P and a secondary machine node S), at step 210. Edges are created, at step 220, from the source to the primary machine nodes. The capacity of primary objects that each machine can hold is also provided (based on the machine's storage), at step 230. An edge is placed from each machine on the secondary side to a sink node Y, at step 240, along with the capacity of secondary objects that each machine can hold. Using the constraints, it is then determined which pairs of machines are permitted to host a primary, secondary pair of replicas, at step 250.

In this example, the n machines in the cluster are denoted by M1, M2, . . . , Mn. The graph G will contain 2n+2 nodes, as follows: a source node X; a sink node Y; n primary nodes, P1, P2, . . . , Pn; and n secondary nodes, S1, S2, . . . , Sn.

Directed edges may be placed on the graph G as follows. There is an edge from the source X to every primary node Pi, with weight equal to the number of primary object replicas to be stored on machine Mi. This weight is denoted by Ai. There is an edge from the source X to every secondary node Si, with weight equal to the number of secondary object replicas to be stored on machine Mi. This weight is denoted by Bi.

Also, there is an edge with weight 1 from every primary node Pi to every secondary node Sj, provided that machines Mi and Mj are permitted to store peers of the same object. Otherwise, there is no edge between Pi and Sj. For example, if the constraints that are being used forbid peers being on the same rack or PDU, then only an edge from Pi to Sj is added if Mi and Mj are on distinct racks and distinct PDUs.

Figure 4:
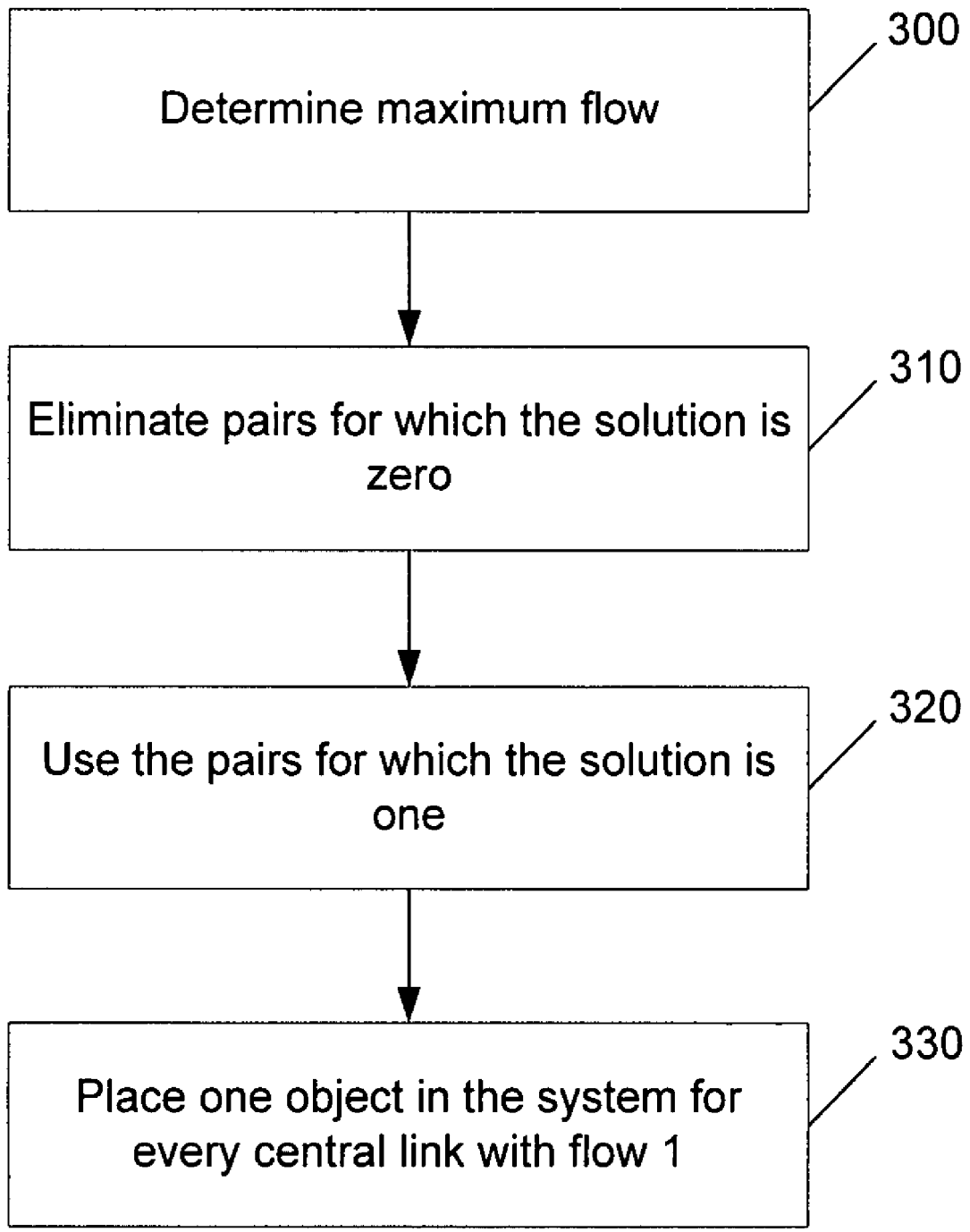
FIG. 4 is a flow diagram of an example method of determining where to place the object replicas.

The graph may then be interpreted as a flow network. FIG. 4 is a flow diagram of an example method of determining where to place the object replicas. The maximum flow may be determined using a standard algorithm, at step 300, for example the Ford-Fulkerson algorithm. The determined maximum flow determines the capacity for each edge. It is noted that there may be many different solutions that provide the maximum flow. After the algorithm is run, an answer can be determined by eliminating the pairs for which the final solution is zero at step 310, and using the pairs for which the final solution is one at step 320. The final solution refers to the capacity between the primary and secondary machines. For the edge from the source to the primary machine, the final solution capacity is the maximum number of replicas that can be stored on the machine.

If the maximum flow does not use all of the bandwidth out of the source and into the sink, then there is no assignment of replicas satisfying all the constraints. On the other hand, if a solution is found, then some of the central links (from primary nodes to secondary nodes) will have flow 1 and others will have flow 0. In this case, the solution to the replica assignment problem is obtained by placing one object in the system for every central link with flow 1, at step 330: if the link is from Pi to Sj, the object's primary replica is placed on Mi and its secondary replica on Mj.

It may be seen that all the constraints are satisfied. There are no central links between "forbidden" pairs of machines, so constraints based on racks, PDUs, and the like, are automatically satisfied. Moreover, recall the constraint which guarantees fast recovery: at most two peers of the object replicas on a given machine may lie on any single other machine. This too is automatically satisfied, since the final flow values on the central links represent the number of objects whose replicas are stored on a given pair of machines, and the maximum possible flow on these links was deliberately set to 1. Given a pair of machines i and j, it is possible that i holds the primary and j holds the secondary for some object, and that j holds the primary and i the secondary for some other object. But no other object can have both replicas on i and j, so the constraint requiring that the "recovery multiple" is at most 2 is satisfied.

A generalization may be obtained as follows. Suppose there is no solution if a recovery multiple of 2 or less is required. The constraints can then be relaxed to obtain recovery that is "as parallel as possible". For example, setting the capacities of the central links in graph G to 2 instead of 1 would permit up to four different objects to have their peers on the same pair of machines, which would limit recovery time to 4T (defining T as the recovery time for a single object, as above). One could progressively increase the capacity of the central links until a solution was found. This solution would have good recovery time while also satisfying the other constraints based on racks, PDUs, and the like.

Exemplary Computing Arrangement

Figure 5:
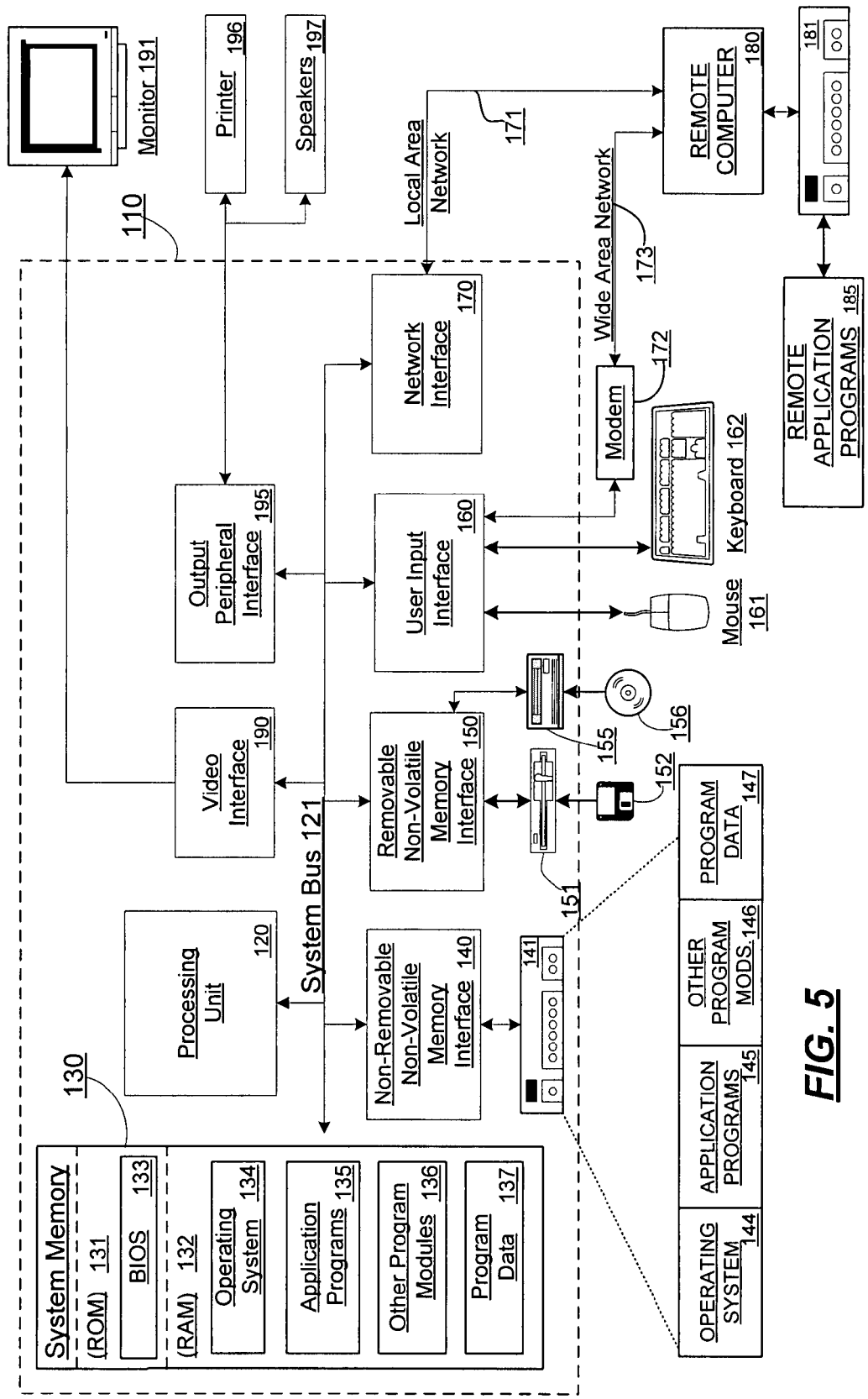
FIG. 5 is a block diagram of an example computing environment in which example embodiments and aspects may be implemented.

FIG. 5 shows an exemplary computing environment in which example embodiments and aspects may be implemented. The computing system environment 100 is only one example of a suitable computing environment and is not intended to suggest any limitation as to the scope of use or functionality. Neither should the computing environment 100 be interpreted as having any dependency or requirement relating to any one or combination of components illustrated in the exemplary operating environment 100.

Numerous other general purpose or special purpose computing system environments or configurations may be used. Examples of well known computing systems, environments, and/or configurations that may be suitable for use include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 5 illustrates operating system 134, application programs 135, other program modules 136, and program data 137.

The computer 110 may also include other removable/non-removable, volatile/nonvolatile computer storage media. By way of example only, FIG. 5 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 5, provide storage of computer readable instructions, data structures, program modules and other data for the computer 110. In FIG. 5, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 5. The logical connections depicted in FIG. 5 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 5 illustrates remote application programs 185 as residing on memory device 181. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method of solving a max flow network problem regarding replica placement of primary and secondary replicas in a computer cluster having a plurality of computing devices, comprising:
   generating a directed graph based on the computing devices in the computer cluster by:
     creating a source node and a sink node;
     for each computing device, creating a respective primary node and a respective secondary node;
     creating a respective first edge from the source node to each primary node;
     assigning a respective first weight of each first edge equal to a number of primary replicas to be stored on a computing device associated with a corresponding primary node;
     creating a respective second edge from the sink node to each secondary node;
     assigning a respective second weight of each second edge eciual to a number of secondary replicas to be stored on a computing associated with a corresponding secondary node;
     when a first machine associated with a primary node and a second machine associated with a secondary node are allowed to store peers of a same object, creating a respective third edge of weight one from the associated primary node to the associated secondary node;
   generating a flow network based on the directed graph;
   solving a network problem based on the flow network to generate a solution; and
   placing the primary and secondary replicas on the computing devices based on the solution of the network problem.

2. The method of claim 1, wherein generating the directed graph comprises using at least one constraint to determine which computing devices may host the primary and secondary replicas using constraints.

3. The method of claim 2, wherein the constraint is the primary and secondary replicas are prevented from being stored on computing devices that are disposed on the same rack of computing devices.

4. The method of claim 2, wherein the constraint is the primary and secondary replicas are prevented from being stored on computing devices that are attached to the same power distribution unit in the computer cluster.

5. The method of claim 2, wherein the constraint is a pair of computing devices is prevented from storing more than two pairs of primary and secondary replicas.

6. The method of claim 1, wherein placing the primary and secondary replicas on the computing devices based on the solution of the network problem comprises eliminating pairs of computing devices for which the solution is zero and using pairs of computing devices to store the primary and secondary replicas for which the solution is one.

7. The method of claim 1, wherein when no solution is found, each of the third edges is progressively assigned an increasing weight until a solution is obtained.

8. The method of claim 7, further comprising determining which computing devices may host the primary and secondary replicas using constraints.

9. The method of claim 1, wherein the solution of the network problem is directed to a capacity between the computing devices to be used to store the primary and secondary replicas.

10. A replica placement system, comprising at least one processor for solving a max flow network problem based on the directed graph, and for determining onto which computing devices in a cluster to dispose the primary replica and the secondary replica, the system, comprising:
    a directed graph, wherein the directed graph comprises:
      a source node and a sink node;
      for each of a plurality of computing devices, a respective primary node and a respective secondary node;
      a respective first edge from the source node to each primary node;
      a respective first weight of each first edge equal to a number of primary replicas to be stored on a computing device associated with a corresponding primary node;
      a respective second edge from the sink node to each secondary node;
      a respective second weight of each second edge eciual to a number of secondary replicas to be stored on a computing associated with a corresponding secondary node;
      a respective third edge of weight one from a primary node to a secondary node when a first machine associated with the primary node and a second machine associated with the secondary node are allowed to store peers of a same object; and
    a cluster of computing devices onto which a primary replica and a secondary replica are disposed based on the directed graph.

11. The system of claim 10, wherein the processor generates the directed graph based on at least one constraint.

12. The system of claim 11, wherein the at least one constraint comprises at least one of the primary and secondary replicas are prevented from being stored on computing devices that are disposed on the same rack of computing devices, the primary and secondary replicas are prevented from being stored on computing devices that are attached to the same power distribution unit in the computer cluster, or the constraint is a pair of computing devices is prevented from storing more than two pairs of primary and secondary replicas.

13. The system of claim 10, wherein the processor, when no solution is found, causes each of the third edges to be progressively assigned an increasing weight until a solution is obtained.

14. A cluster of computing devices for solving a max flow network problem, the cluster comprising:
a plurality of computing devices; and
a plurality of racks on which at least some of the computing devices are disposed,
wherein a primary replica and a secondary replica are disposed on a pair of the computing devices in accordance with a solution to a network problem based on a directed graph, wherein the directed graph comprises:
a source node and a sink node;
for each of the computing devices, a respective primary node and a respective secondary node;
a respective first edge from the source node to each primary node;
a respective first weight of each first edge equal to a number of primary object replicas to be stored on a computing device associated with a corresponding primary node;
a respective second edge from the sink node to each secondary node;
a respective second weight of each second edge equal to a number of secondary object replicas to be stored on a computing associated with a corresponding secondary node;
a respective third edge of weight one from a primary node to a secondary node when a first machine associated with the primary node and a second machine associated with the secondary node are allowed to store peers of a same object.

15. The cluster of computing devices of claim 14, wherein the directed graph is based on at least one constraint comprising at least one of the primary and secondary replicas are prevented from being stored on computing devices that are disposed on the same rack of computing devices, the primary and secondary replicas are prevented from being stored on computing devices that are attached to the same power distribution unit in the computer cluster, or the constraint is a pair of computing devices is prevented from storing more than two pairs of primary and secondary replicas.

16. The cluster of computing devices of claim 14, further comprising a processor adapted to:
when no solution is found to the network problem, cause each of the third edges to be progressively assigned an increasing weight until a solution is obtained.

* * * * *

UNITED STATES PATENT AND TRADEMARK OFFICE
CERTIFICATE OF CORRECTION

| | |
|---|---|
| PATENT NO. | : 7,685,179 B2 |
| APPLICATION NO. | : 11/717285 |
| DATED | : March 23, 2010 |
| INVENTOR(S) | : John P. MacCormick |

It is certified that error appears in the above-identified patent and that said Letters Patent is hereby corrected as shown below:

In column 7, line 44, in Claim 1, delete "eciual" and insert -- equal --, therefor.

In column 8, line 12, in Claim 7, after "wherein" insert -- , --.

In column 8, line 22, in Claim 10, delete "system," and insert -- system --, therefor.

In column 8, line 40, in Claim 10, delete "eciual" and insert -- equal --, therefor.

Signed and Sealed this
Twenty-fifth Day of January, 2011

David J. Kappos
*Director of the United States Patent and Trademark Office*